(12) United States Patent
Duffy et al.

(10) Patent No.: US 8,263,700 B2
(45) Date of Patent: Sep. 11, 2012

(54) PIGMENT DISPERSIONS, RELATED COATING COMPOSITIONS AND COATED SUBSTRATES

(75) Inventors: Shawn P. Duffy, Cheswick, PA (US); Susan F. Donaldson, Allison Park, PA (US); Robert E. Jennings, Ellwood City, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 13/011,004

(22) Filed: Jan. 21, 2011

(65) Prior Publication Data

US 2011/0294942 A1 Dec. 1, 2011

Related U.S. Application Data

(60) Provisional application No. 61/350,047, filed on Jun. 1, 2010.

(51) Int. Cl.
*C09B 67/00* (2006.01)
*C08F 8/30* (2006.01)

(52) U.S. Cl. ........................ 524/502; 524/555

(58) Field of Classification Search ............... 526/317.1, 526/318, 347; 106/494
See application file for complete search history.

(56) References Cited

U.S. PATENT DOCUMENTS

| | | | |
|---|---|---|---|
| 3,399,152 A | 8/1968 | Jamrog et al. | |
| 3,940,353 A | 2/1976 | Martorano | |
| 4,026,855 A | 5/1977 | Parekh et al. | |
| 4,093,569 A | 6/1978 | Reischl et al. | |
| 4,302,560 A | 11/1981 | Becher et al. | |
| 4,302,561 A | 11/1981 | Becher et al. | |
| 4,302,562 A | 11/1981 | Becher et al. | |
| 4,303,764 A * | 12/1981 | Becher et al. ............ 524/558 |
| 4,310,448 A | 1/1982 | Reischl | |
| 4,310,449 A | 1/1982 | Reischl | |
| 4,339,365 A | 7/1982 | Becher et al. | |
| 4,340,523 A | 7/1982 | Hazan | |
| 4,543,393 A | 9/1985 | Blum et al. | |
| 4,558,090 A | 12/1985 | Drexler et al. | |
| 4,584,261 A | 4/1986 | Held | |
| 4,621,043 A | 11/1986 | Gervay | |
| 4,734,137 A | 3/1988 | Kasahara et al. | |
| 4,839,414 A | 6/1989 | Bederke et al. | |
| 4,910,249 A | 3/1990 | Kania et al. | |
| 5,079,325 A | 1/1992 | Kano et al. | |
| 5,288,828 A | 2/1994 | Harris et al. | |
| 5,430,089 A | 7/1995 | Harris et al. | |
| 5,508,340 A | 4/1996 | Hart | |
| 5,514,755 A | 5/1996 | Fenn et al. | |
| 5,530,043 A | 6/1996 | Zawacky et al. | |
| 5,633,307 A | 5/1997 | Das et al. | |
| 5,652,294 A | 7/1997 | Jennings et al. | |
| 5,665,434 A | 9/1997 | Mass et al. | |
| 5,688,860 A | 11/1997 | Croft | |
| 5,693,703 A | 12/1997 | Hart | |
| 5,780,541 A | 7/1998 | Mayenfels et al. | |
| 5,807,924 A | 9/1998 | Becker et al. | |
| 5,998,535 A * | 12/1999 | Haldankar ............... 524/555 |
| 6,001,374 A | 12/1999 | Nichols | |
| 6,090,881 A | 7/2000 | Das et al. | |
| 6,207,744 B1 | 3/2001 | Paulus et al. | |
| 6,316,535 B1 | 11/2001 | Caldwell et al. | |
| 6,326,059 B1 | 12/2001 | Lewin et al. | |
| 6,395,820 B1 | 5/2002 | Lindenmuth et al. | |
| 6,410,619 B2 * | 6/2002 | Greene et al. ............. 524/88 |
| 6,433,085 B1 | 8/2002 | Huynh-Ba | |
| 6,471,185 B2 | 10/2002 | Lewin et al. | |
| 6,503,999 B1 | 1/2003 | Mitchell | |
| 6,538,046 B1 | 3/2003 | Paulus et al. | |
| 6,559,265 B2 | 5/2003 | Lamers et al. | |
| 6,703,452 B2 | 3/2004 | Huynh-Ba | |
| 6,780,908 B1 | 8/2004 | Huynh-Ba | |
| 6,989,421 B2 | 1/2006 | Grady | |
| 7,125,932 B2 | 10/2006 | Huynh-Ba | |
| 7,662,875 B2 | 2/2010 | Huybrechts | |
| 2003/0017331 A1 | 1/2003 | Okochi et al. | |
| 2006/0162892 A1 | 7/2006 | Laari | |
| 2008/0221271 A1 | 9/2008 | Duggal et al. | |
| 2009/0198016 A1 | 8/2009 | Sormani et al. | |

FOREIGN PATENT DOCUMENTS

| | | |
|---|---|---|
| EP | 0032570 A2 | 7/1981 |
| EP | 0115354 A2 | 8/1984 |
| EP | 0201347 A2 | 11/1986 |
| EP | 1103580 A1 | 5/2001 |

* cited by examiner

*Primary Examiner* — Hui Chin
(74) *Attorney, Agent, or Firm* — Donald R. Palladino

(57) ABSTRACT

Disclosed are pigment dispersions and coating compositions that include such pigment dispersions. The pigment dispersions include: (a) a pigment; (b) an acid functional, hydroxyl functional and secondary amine functional acrylic polymer having a weight average molecular weight of at least 11,000; and (c) a liquid carrier comprising an organic solvent.

15 Claims, No Drawings

PIGMENT DISPERSIONS, RELATED COATING COMPOSITIONS AND COATED SUBSTRATES

CROSS-REFERENCE TO RELATED APPLICATIONS

This application claims the benefit of U.S. Provisional Patent Application Ser. No. 61/350,047, filed Jun. 1, 2010, which is incorporated by reference herein in its entirety.

FIELD OF THE INVENTION

The present invention relates to pigment dispersions suitable for use in a variety of coating compositions. The pigment dispersions are particularly suitable for use in coating compositions that must be particularly resistant to exposure to organic solvents, as is the case in many applications.

BACKGROUND INFORMATION

Pigmented coating compositions are useful for their aesthetic as well as protective features. Such compositions often contain a film-forming resin and a pigment dispersed in a liquid carrier. It is important that the pigment be satisfactorily dispersed throughout any film which results from the application of the coating composition. It is therefore desirable that the pigment be well dispersed throughout the liquid coating composition. Typically, the pigment to be used in a coating composition is first dispersed with only a portion of the total film-forming resin of which the coating composition is comprised (often referred to as a pigment "grind resin") together with appropriate liquid carriers and additives. The resulting dispersion is then mixed with the remainder of the film-forming resin and any other necessary components to produce the coating composition.

A number of different film-forming resins are used in the manufacture of different coating compositions. As a result, so-called "multi-purpose" pigment grinding resins have been used that are compatible with a wide range of film-forming resins and solvents.

Exemplary of such "multi-purpose" pigment grinding resins are the amine functional acrylic grind resins described in U.S. Pat. No. 4,303,764. Due to their relatively low molecular weight, however, these grind resins may be undesirable for use in preparing coatings having the physical properties, such as solvent resistance, necessary for use in many applications. Another example of such "multi-purpose" grinding vehicles are the acrylic polymers having pendant tertiary alkyl primary amine groups and at least one other pendant functionality reactive with isocyanate groups described in U.S. Pat. No. 4,910,249. The cost and lack of commercial availability of the amine-group containing monomer used to make such grind vehicles, however, makes these grind vehicles unattractive commercially for coatings to be used in many applications.

As a result, it is desired to provide "multi-purpose" pigment dispersions that include a pigment grind resin that is prepared from relatively low cost and readily available monomers and which is capable of use in coating compositions designed for use in applications in which the coating must be particularly resistant to exposure to organic solvents.

SUMMARY OF THE INVENTION

In certain respects, the present invention is directed to pigment dispersions. These dispersions comprise: (a) a pigment; (b) an acrylic polymer comprising acid groups, secondary amine groups, and hydroxyl groups and having a weight average molecular weight of at least 11,000; and (c) a liquid carrier comprising an organic solvent.

In other respects, the present invention is directed to pigment dispersions comprising: (a) a pigment; (b) an acrylic polymer comprising secondary amine groups and hydroxyl groups and having a weight average molecular weight of at least 11,000; and (c) a liquid carrier comprising an organic solvent. In these pigments dispersions, the acrylic polymer is substantially free of any moieties derived from an alkyl methacrylate monomer having greater than 8 carbon atoms in the alkyl chain.

The present invention is also related to, inter alia, methods for using such coating compositions and substrates at least partially coated with a coating deposited from such compositions.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As previously mentioned, certain embodiments of the present invention are directed to pigment dispersions. These dispersions comprise: (a) a pigment; (b) an acrylic polymer; and (c) a liquid vehicle.

Pigments used in the dispersions of the present invention include any of those conventionally used in the coatings industry, including inorganic and organic pigments. Exemplary organic pigments include azo compounds (monoazo, di-azo, β-Naphthol, Naphthol AS salt type azo pigment lakes, benzimidazolone, di-azo condensation, isoindolinone, isoindoline), and polycyclic (phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone) pigments, and mixtures of any of the foregoing. In certain embodiments, the organic material comprises a perylene, quinacridone, phthalocyanine, isoindoline, dioxazine (that is, triphenedioxazine), 1,4-diketopyrrolopyrrole, anthrapyrimidine, anthanthrone, flavanthrone, indanthrone, perinone, pyranthrone, thioindigo, 4,4'-diamino-1,1'-dianthraquinonyl, as well as substituted derivatives thereof, and mixtures thereof. Exemplary inorganic pigments include iron oxides, lead chromates, strontium chromates, lead carbonates, lead sulfates, barium carbonates, china clay, calcium carbonate, aluminum silica, zinc oxide, zinc sulfide, zirconium oxide, antimony oxide, titanium dioxide, chrome green, chrome yellow, thio-indigo red, cobalt blue, cadmium yellow, cadmium red, graphite, carbon black, metallic aluminum and metallic zinc, among many others.

The dispersions of the present invention comprise an acrylic polymer comprising acid, secondary amine, and hydroxyl groups. In certain embodiments, the acrylic polymer is the polymerization product of a mixture of monomers comprising: (a) an alkyl(meth)acrylate having from 3 to 8 carbon atoms in the alkyl group; (b) a monomer selected from styrene, methyl(meth)acrylate, and ethyl(meth)acrylate, or a mixture thereof; (c) an ethylenically unsaturated carboxylic acid; (d) a hydroxyl-functional ethylenically unsaturated monomer; and (e) a secondary amine-functional ethylenically unsaturated monomer. As used herein, "(meth)acrylate" is meant to encompass both methacrylate and acrylate.

Exemplary alkyl(meth)acrylates having from 3 to 8 carbon atoms in the alkyl group, which are suitable for use in the present invention, include isopropyl(meth)acrylate, butyl(meth)acrylate, isobutyl(meth)acrylate, isoamyl(meth)acrylate, hexyl(meth)acrylate, 2-ethylhexyl(meth)acrylate, octyl(meth)acrylate, and combinations thereof. In certain embodiments of the present invention, the alkyl(meth)acrylate having from 3 to 8 carbon atoms in the alkyl group comprises a combination of butyl(meth)acrylate and 2-ethylhexyl(meth)acrylate, such as a combination of butyl methacrylate and 2-ethylhexyl methacrylate. In certain embodiments, the alkyl(meth)acrylate(s) having from 3 to 8 carbon atoms in the alkyl group is present in an amount of at least 1 percent by weight, such as at least 10 percent by weight, at least 20 percent by weight, or at least 25 percent by weight, the weight percents being based on the total weight of the monomers used to make the acrylic polymer. In certain embodiments, the alkyl(meth)acrylate(s) having from 3 to 8 carbon atoms in the alkyl group is present in an amount of no more than 50 percent by weight, such as no more than 40 percent by weight or no more than 30 percent by weight, wherein the weight percents are based on the total weight of monomers used to make the acrylic polymer. In certain embodiments of the present invention, the alkyl(meth)acrylate(s) having from 3 to 8 carbon atoms in the alkyl group comprises a combination of at least 10 percent by weight (such as at least 15 percent by weight) and no more than 35 percent by weight (such as no more than 25 percent by weight) butyl(meth)acrylate and at least 5 percent by weight (such as at least 10 percent by weight) and no more than 20 percent by weight (such as no more than 15 percent by weight) 2-ethylhexyl(meth)acrylate, such percentages being based on the total weight of monomers used to make the acrylic polymer.

In certain embodiments, the monomer selected from styrene, methyl(meth)acrylate, and ethyl(meth)acylate, or a combination thereof is present in an amount of at least 10 percent by weight, such as at least 20 percent by weight, at least 30 percent by weight, or at least 40 percent by weight, the weight percents being based on the total weight of the monomers used to make the acrylic polymer. In certain embodiments, the monomer selected from a styrene, methyl(meth)acrylate, and ethyl(meth)acylate, or a combination thereof is present in an amount of no more than 80 percent by weight, such as no more than 70 percent by weight or no more than 60 percent by weight, wherein the weight percents are based on the total weight of monomers used to make the acrylic polymer. In certain embodiments of the present invention, the monomer selected from a styrene, methyl(meth)acrylate, and ethyl(meth)acylate, or a combination thereof comprises at least 5 percent by weight (such as at least 10 or at least 15 percent by weight) and no more than 40 percent by weight (such as no more than 30 or no more than 25 percent by weight) of a styrene and at least 5 percent by weight (such as at least 10 or at least 20 percent by weight) and no more than 40 percent by weight (such as no more than 30 percent by weight) methyl methacrylate, such percentages being based on the total weight of monomers used to make the acrylic polymer.

Exemplary carboxylic acid functional monomers include, but are not limited to, (meth)acrylic acid, acryloxypropionic acid, crotonic acid, fumaric acid, monoalkyl esters of fumaric acid, maleic acid, monoalkyl esters of maleic acid, itaconic acid, monoalkyl esters of itaconic acid and combinations thereof. In certain embodiments, the carboxylic acid functional monomer, such as (meth)acrylic acid, is present in an amount of at least 0.1 percent by weight, such as 0.1 to 5, 0.1 to 1, 0.1 to 0.9, or 0.5 percent by weight, the weight percents being based on the total weight of the monomers used to make the acrylic polymer.

Exemplary hydroxyl-functional ethylenically unsaturated monomers include, but are not limited to, hydroxy ethyl(meth)acrylate, hydroxy propyl(meth)acrylate, hydroxyl butyl(meth)acrylate, and combinations thereof. In certain embodiments, the hydroxyl-functional ethylenically unsaturated monomer is present in an amount of at least 1 percent by weight, such as at least 10 percent by weight, or at least 20 percent by weight, the weight percents being based on the total weight of the monomers used to make the acrylic polymer. In certain embodiments, the hydroxyl-functional ethylenically unsaturated monomer is present in an amount of no more than 50 percent by weight, such as no more than 40 percent by weight or no more than 25 percent by weight, wherein the weight percents are based on the total weight of monomers used to make the acrylic polymer. In some embodiments of the present invention, the hydroxyl-functional ethylenically unsaturated monomer is present in an amount such that the resulting acrylic polymer has a hydroxyl equivalent weight of at least 200 grams per solid equivalents, such as at least 300, at least 400, or, in some cases at least 500 grams per solid equivalents. In some embodiments of the present invention, the hydroxyl-functional ethylenically unsaturated monomer is present in an amount such that the resulting acrylic polymer has a hydroxyl equivalent weight of no more than 1,000 grams per solid equivalents, such as no more than 800, no more than 700, or, in some cases no more than 600 grams per solid equivalents. In some embodiments of the present invention, the acrylic polymer has a hydroxyl equivalent weight of 500 to 600 grams per solid equivalents.

Exemplary secondary amine-functional ethylenically unsaturated monomers include, but are not limited to, t-butylaminoethyl(meth)acrylate, often t-butylaminoethyl methacrylate, including combinations thereof. In certain embodiments, the secondary amine-functional ethylenically unsaturated monomer is present in an amount of at least 0.1 percent by weight, such as 0.1 to 5, 0.1 to 1, 0.1 to 0.9, or 0.5 percent by weight, the weight percents being based on the total weight of the monomers used to make the acrylic polymer.

In certain embodiments, the acrylic polymer is the polymerization product of monomers comprising no more than 2 percent by weight, in some cases, no more than 1 percent by weight, no more than 0.5 percent by weight, or in yet other cases, no more than 0.1 percent by weight, of other monomers, such as an alkyl(meth)acrylate monomer having greater than 8 carbon atoms in the alkyl chain.

In certain embodiments, the acrylic polymer present in the pigment dispersions of the present invention can be made by conventional solution polymerization techniques in an organic solvent, such as is described in the Examples herein. In certain embodiments, a so called "one shot" procedure is used wherein each of the individual monomers is present at the start of the polymerization reaction. The reaction, in some cases, is conducted at a temperature of 80° C. to 160° C. for about 45 minutes to 6 hours. Examples of suitable organic solvents include the following: ether-type alcohols, e.g., ethylene glycol monobutylether, ethylene glycol monoethylether and propylene glycol monobutylether; alcohols, such as ethanol, propanol, isopropanol, butanol, and isobutanol; and other solvents, such as n-butyl acetate, toluene, methyl ethyl ketone, methyl amyl ketone, V. M. and P Naphtha and the like. The polymerization is often carried out in the presence of a vinyl polymerization catalyst, such as azobis(isobutyronitrile), 2,2'-azobis(2-methylbutyronitrile), 2,2'-azobis(2-methylpropionitrile), tertiary butyl perbenzoate, tertiary butyl pivalate, tertiary butyl acetate, isopropyl percarbonate, t-amyl peroxy 2-ethyl hexanoate, or benzoyl peroxide. Chain transfer agents such as alkyl mercaptans, e.g., tertiary dodecyl mercaptan and the like, can also be used if desired. It should be recognized that the reaction product can be isolated or have a part of the solvent removed. In certain embodiments, the solvent is retained for convenience in later forming the pigment dispersion and any coating composition containing the same.

The resultant acrylic polymer has a weight average molecular weight determined by gel permeation chromatography, using a polystyrene standard, of at least 11,000, in some cases, at least 12,000, such as 12,000 to 20,000, or, in some cases, 13,000 to 17,000. The molecular weight of polymers described herein, including in the Examples, is determined by gel permeation chromatography using a polystyrene standard. Determination of molecular weights of polymers in this manner is well known.

In certain embodiments, the resultant acrylic polymer has a calculated glass transition temperature ("Tg") of 0° C. to 50° C., such as 10° C. to 50° C., or 20° C. to 60° C. or 20° C. to 40° C. As used herein, the "calculated Tg" of a polymer refers to the Tg of a theoretical polymer formed from the selected monomers, in their selected amounts, calculated as described in "The Chemistry of Organic Film Formers," D. H. Solomon, J. Wiley & Sons, New York, 1967, p. 29.

In certain embodiments, the pigment dispersions of the present invention comprise, or, in some cases, consist essentially of from 1 to 90 percent by weight, such as 10 to 90, 10 to 50, or 20 to 40 percent by weight of the aforedescribed acrylic polymer, from 1 percent to about 50 percent by weight, such as 3 to 30, 5 to 20, or 5 to 15 percent by weight, of a pigment, and the balance a liquid carrier. In certain embodiments, the weight ratio of pigment to acrylic polymer in the pigment dispersion is at least 0.1:1, in some cases at least 0.2:1. As used herein, "consisting essentially of" when used with reference to the components present in a pigment dispersion, means that the dispersion includes no more than 5 percent by weight, in some cases no more than 3 percent by weight, based on the total weight of the dispersion, of unrecited components, such as, for example, additives commonly used in coating compositions, for example, plasticizers, wetting agents, diluents, and flow control agents, among others.

The liquid carrier used in the pigment dispersions are often conveniently the solvents used in the reaction of the monomers to form the acrylic polymer described above. However, other solvents can be added, such as xylene or mineral spirits.

Pigment dispersions are often made by grinding or dispersing the pigment into the acrylic polymer. The grinding is often accomplished by the use of ball mills, sand mills, Cowles dissolvers, continuous attritors and the like, until the pigment has been reduced to the desired size. After grinding, the particle size of the pigment is often in the range of about 10 microns or less.

The pigment dispersions described above are often added to coating compositions either by the manufacturer and/or just prior to use by the consumer as a tinting composition. The pigment dispersions described herein are compatible with a wide variety of film-forming resins. Moreover, in certain embodiments, the coating compositions of the present invention comprise up to 50 (or, in some cases, up to 40, up to 30, or up to 25) percent by weight, as well as at least 1, at least 10, at least 15, and in some cases, at least 20 percent by weight, based on the total weight of resin solids, of the carboxylic acid functional, hydroxyl functional and secondary amine functional acrylic polymer described above. The ability to use relatively high loadings of the acrylic polymer described herein, without significantly negatively impacting important coating properties, such as chemical resistance and adhesion to substrates, particularly plastic substrates, was a surprising discovery and is important to enable coatings having a wide range of color space to be made using the pigment dispersions described herein.

Suitable film-forming resins used in conjunction with the pigment dispersions are, without limitation, epoxy, vinyl, alkyd, polyester, acrylic, aminoplast, phenolplast, cellulose derivative, amide or urethane resins or mixtures thereof. Copolymers derived from such resins are also useful herein. Such resins are described, for example, in U.S. Pat. No. 4,303,764 at col. 7, line 18 to col. 11, line 7, the cited portion of which being incorporated herein by reference.

Film-forming resins included within the coating compositions described herein may comprise a thermoplastic and/or a thermosetting film-forming resin. As used herein, the term "thermosetting" refers to resins that "set" irreversibly upon curing or crosslinking, wherein the polymer chains of the polymeric components are joined together by covalent bonds. This property is usually associated with a cross-linking reaction of the composition constituents often induced, for example, by heat. See Hawley, Gessner G. The Condensed Chemical Dictionary, Ninth Edition, page 856; Surface Coatings, vol. 2, Oil and Colour Chemists' Association, Australia, TAFE Educational Books (1974). Curing or crosslinking reactions also may be carried out under ambient conditions. Once cured or crosslinked, a thermosetting resin will not melt upon the application of heat and is insoluble in solvents. In other embodiments, the film-forming resin included within the coating compositions described herein comprises a thermoplastic resin. As used herein, the term "thermoplastic" refers to resins that comprise polymeric components that are not joined by covalent bonds and thereby can undergo liquid flow upon heating and are soluble in solvents. See Saunders, K. J., Organic Polymer Chemistry, pp. 41-42, Chapman and Hall, London (1973).

The coating composition(s) described herein can comprise any of a variety of thermoplastic and/or thermosetting compositions known in the art. Thermosetting coating compositions typically comprise a crosslinking agent that may be selected from, for example, aminoplasts, polyisocyanates including blocked isocyanates, polyepoxides, beta-hydroxyalkylamides, polyacids, anhydrides, organometallic acid-functional materials, polyamines, polyamides, and mixtures of any of the foregoing.

Thermosetting or curable coating compositions typically comprise film forming polymers having functional groups that are reactive with the crosslinking agent. The film-forming resin in the coating compositions described herein may be selected from any of a variety of polymers well-known in the art. The film-forming resin can be selected from, for example, acrylic polymers, polyester polymers, polyurethane polymers, polyamide polymers, polyether polymers, polysiloxane polymers, copolymers thereof, and mixtures thereof. Generally these polymers can be any polymers of these types made by any method known to those skilled in the art. The functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups), mercaptan groups, and combinations thereof.

Appropriate mixtures of film-forming resins may also be used in the preparation of the coating compositions described herein.

In certain embodiments, to form a coating composition of the present invention, the pigment dispersion comprising the combination of pigment, the acrylic polymer and the liquid carrier, is combined with an active hydrogen containing film-forming polymer and optionally a crosslinker which is reactive with both the acrylic polymer and the active hydrogen-functional film-forming polymer. By "active hydrogen" is meant those reactive groups as determined by the Zerewitinoff Method as described by Kohler in J. Am. Chem. Soc. 49, 3181 (1927). Representative active hydrogen containing groups include —OH, —COOH, —SH, —NH, etc.

The pigment dispersions described herein are also capable of being used in radiation curable film-forming compositions. As used herein, a "radiation curable film-forming composition" refers to a composition that includes a radiation curable compound. As used herein, a "radiation-curable compound" refers to any compound that, when exposed to radiation, will undergo crosslinking with itself and/or another radiation-curable compound. Often, such compounds comprise a "radiation-curable moiety" through which radiation cure occurs. Such moieties may, for example, comprise C=$CH_2$ functionality. These compounds may further comprise a second functionality such as hydroxy, thiol, primary amines and/or secondary amines, among others.

In certain embodiments, the radiation-curable compound comprises a (meth)acrylic polymer or copolymer. As indicated earlier, "(meth)acrylic" and like terms refers both to the acrylic and the corresponding methacrylic. Suitable (meth)acrylic polymers include (meth)acrylic functional (meth)acrylic copolymers, epoxy resin(meth)acrylates, polyester (meth)acrylates, polyether(meth)acrylates, polyurethane (meth)acrylates, amino(meth)acrylates, silicone(meth)acrylates, and melamine(meth)acrylates. The number average molecular weight ("Mn") of these compounds often range from 200 to 10,000, such as 1200 to 3000. These compounds can contain any number of olefinic double bonds that allow the compound to be polymerized upon exposure to radiation; in certain embodiments, the compounds have an olefinic equivalent weight of 500 to 2000. The (meth)acrylic polymers can be (cyclo)aliphatic and/or aromatic.

In certain embodiments, the (meth)acrylic copolymer comprises a urethane linkage, and in certain other embodiments can comprise a urethane linkage, a terminal acrylate group, and a hydroxy group. Specific examples of polyurethane(meth)acrylates are reaction products of a polyisocyanate such as 1,6-hexamethylene diisocyanate and/or isophorone diisocyanate, including isocyanurate and biuret derivatives thereof, with hydroxyalkyl(meth) acrylate such as hydroxyethyl(meth)acrylate and/or hydroxypropyl(meth) acrylate. The polyisocyanate can be reacted with the hydroxyalkyl(meth)acrylate in a 1:1 equivalent ratio or can be reacted with an NCO/OH equivalent ratio greater than 1 to form an NCO-containing reaction product that can then be chain extended with a polyol such as a diol or triol, for example 1,4-butane diol, 1,6-hexane diol and/or trimethylol propane. Examples of polyester(meth)acrylates are the reaction products of a (meth)acrylic acid or anhydride with a polyol, such as diols, triols and tetraols, including alkylated polyols, such as propoxylated diols and triols. Examples of polyols include 1,4-butane diol, 1,6-hexane diol, neopentyl glycol, trimethylol propane, isosorbide, pentaerythritol and propoxylated 1,6-hexane diol.

In certain embodiments, such polymer(s) are present in the radiation curable film-forming composition in an amount ranging from 10 to 90 percent by weight, such as from 10 to 50, or, in some cases, 20 to 40 percent weight, based on the total weight of the composition.

The radiation curable film-forming coating composition may further comprise at least one multi-functional (meth)acrylate monomer, which refers to monomers having a (meth)acrylate functionality of greater than 1.0, such as at least 2.0. Multifunctional acrylates suitable for use in the compositions of the present disclosure include, for example, those that have a relative molar mass of from 170 to 5000 grams per mole, such as 170 to 1500 grams per mole.

Multi-functional (meth)acrylate monomers suitable for use in the radiation curable film-forming compositions described herein may include, without limitation, difunctional, trifunctional, tetrafunctional, pentafunctional, hexafunctional (meth)acrylates and mixtures thereof.

Representative examples of suitable multi-functional (meth)acrylates include, without limitation, ethylene glycol di(meth)acrylate, 1,3-butylene glycol di(meth)acrylate, 1,4-butanediol diacrylate, 2,3-dimethylpropane 1,3-diacrylate, 1,6-hexanediol di(meth)acrylate, dipropylene glycol diacrylate, ethoxylated hexanediol di(meth)acrylate, propoxylated hexanediol di(meth)acrylate, neopentyl glycol di(meth)acrylate, alkoxylated neopentyl glycol di(meth)acrylate, hexylene glycol di(meth)acrylate, diethylene glycol di(meth)acrylate, tripropylene glycol di(meth)acrylate, thiodiethyleneglycol diacrylate, trimethylene glycol dimethacrylate, pentaerythritol tri(meth)acrylate, trimethylolpropane tri(meth)acrylate, ditrimethylolpropane tetra(meth)acrylate, glycerolpropoxy tri(meth)acrylate, ethoxylated trimethylolpropane tri(meth) acrylate, and tetraethylene glycol di(meth)acrylate, including mixtures thereof.

In certain embodiments, the multifunctional (meth)acrylate monomer is present in the radiation curable composition in an amount ranging from 1 to 30 percent by weight, such as from 1 to 20, or, in some cases, 5 to 15 percent weight, based on the total weight of the radiation curable film-forming composition.

In certain embodiments, the radiation curable film-forming composition may also comprise a fluorine-containing radiation curable compound. A suitable class of such compounds can be represented by the general formula (I):

$$(R_A)_x—W—(R_f)_y \qquad (I)$$

wherein: (i) each $R_A$ independently represents a radiation curable moiety, such as a moiety comprising a (meth)acrylate group, each $R_f$ independently represents a fluorinated moiety, x is at least 2, such as from 2 to 5; y is at least 1, such as 1 to 5; and W is a group linking $R_A$ and $R_f$. Some examples of fluorine-containing radiation curable compounds that are suitable for use in the present invention are described in U.S. Pat. No. 6,238,798 at col. 4, line 21 to col. 7, line 34, the cited portion of which being incorporated herein by reference.

In some embodiments, the fluorine-containing radiation curable compound comprises a perfluoro-type polymer. As used herein, a perfluoro-type polymer refers to a polymer in which most of or all of hydrogen of alkyl groups and/or alkylene groups in the polymer are substituted with a fluorine. As used herein, a polymer in which 85% or more of hydrogen of alkyl groups and/or alkylene groups are substituted with a fluorine, is defined as a perfluoro-type polymer.

In certain embodiments, the fluorine-containing radiation curable compound comprises a perfluoropolyether (PFPE) and one or more, often two or more, polymerizable unsaturated groups, such as (meth)acrylate groups, per molecule. Fluorine-containing radiation curable compounds can be derived from, for example, a polyisocyanate, such as a triisocyanate, reacted with a hydroxyl-functional fluoropolymer and a hydroxyl-functional (meth)acrylate. Thus, in certain embodiments, the fluorine-containing radiation curable compound of structure (I) is represented by the general structure (Ia).

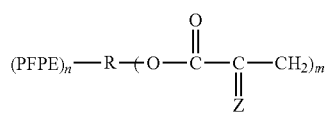

(Ia)

in which: (a) each n and m is independently 1 or 2 (in some embodiments m+n=3); (b) R is a linking group (in some embodiments R comprises one or more urethane linkages); and (c) Z is H or $CH_3$.

In certain embodiments, the weight average molecular weight of the fluorine-containing radiation curable compound is from 400 to 40,000, such as 400 to 5000, or, in some cases, 800 to 4000 or 1000 to 3000.

Further, in some embodiments of the present invention the fluorine-containing radiation curable compound comprises a compound represented by the following formula (II).

$$(Rf^1)—[(W)—(R_A)_n]_m \qquad (II)$$

wherein: $Rf^1$ represents a (per)fluoroalkyl group or a (per)fluoropolyether group; W represents a single bond or a linking group; $R_{(A)}$ represents a functional group having an unsaturated double bond; n represents an integer of 1 to 3, such as 2 to 3; and m represents an integer of 1 to 3, such as 2 to 3.

Depending upon the energy source used to cure the transparent radiation-curable film-forming composition described herein, an initiator may be required to generate the free radicals which initiate polymerization. Examples of suitable free radical initiators that generate a free radical source when exposed to thermal energy include, but are not limited to, peroxides such as benzoyl peroxide, azo compounds, benzophenones, and quinones. Examples of photoinitiators that generate a free radical source when exposed to visible light radiation include, but are not limited to, camphorquinones/alkyl amino benzoate mixtures. Examples of photoinitiators that generate a free radical source when exposed to ultraviolet light include, but are not limited to, organic peroxides, azo compounds, quinones, benzophenones, nitroso compounds, acryl halides, hydrozones, mercapto compounds, pyrylium compounds, triacrylimidazoles, bisimidazoles, chloroalkyl-riazines, benzoin, benzoin methyl ether, benzoin ethyl ether, benzoin isopropyl ether, benzoin isobutyl ethers and methylbenzoin, diketones such as benzil and diacetyl, phenones such as acetophenone, 2,2,2-tri-bromo-1-phenylethanone, 2,2-diethoxyacetophenone, 2,2-dimethoxy-2-phenylacetophenone, 2,2,2,-tribromo-1(2-nitrophenyl)ethanone, benzophenone, 4,4-bis(dimethyamino)benzophenone, and acyl phosphates. Examples of commercially available ultraviolet photoinitiators include those available under the trade designations IRGACURE 184 (1-hydroxycyclohexyl phenyl ketone), IRGACURE 361 and DAROCUR 1173 (2-hydroxy-2-methyl-1-phenyl-propan-1-one) from Ciba-Geigy. In certain embodiments, the initiator is used in an amount of from 0.1 to 10 percent by weight, such as 1 to 5 percent by weight, based on the total weight of the transparent radiation-curable composition.

In certain embodiments, the transparent radiation-curable composition includes a photosensitizer, which aids in the formation of free radicals, especially in an air atmosphere. Suitable photosensitizers include, but are not limited to, aromatic ketones and tertiary amines. Suitable aromatic ketones include, but are not limited to, benzophenone, acetophenone, benzil, benzaldehyde, and o-chlorobenzaldehyde, xanthone, thioxanthone, 9,10-anthraquinone, and many other aromatic ketones. Suitable tertiary=lines include, but are not limited to, methyldiethanolamine, ethyldiethanolamine, triethanolamine, phenylmethyl-ethanolamine, dimethylaminoethylbenzoate, and the like. In certain embodiments, the photosensitizer is used in an amount of from 0.01-10 percent by weight, such as 0.05 to 5 percent by weight, based on the total weight of the composition.

The coating compositions of the present invention may further contain other optional ingredients such as plasticizers, ultraviolet absorbers, antioxidants, surfactants and the like. These optional ingredients when present are often present in amounts up to 30 percent by weight based on total weight of the coating composition.

The coating compositions of the present invention can be produced by any method well known to the one having an ordinary skill in the art using the above components as raw materials. Suitable methods are described in the Examples herein.

The present invention also relates to methods of using the foregoing coating compositions. These methods comprise applying the coating composition to the surface of a substrate or article to be coated, allowing the composition to form a substantially continuous film and then allowing the film to cure.

Suitable substrates include cellulosic-containing materials, including paper, paperboard, cardboard, plywood and pressed fiber boards, hardwood, softwood, wood veneer, particleboard, chipboard, oriented strand board, and fiberboard. Such materials may be made entirely of wood, such as pine, oak, maple, mahogany, cherry, and the like. In some cases, however, the materials may comprise wood in combination with another material, such as a resinous material, i.e., wood/resin composites, such as phenolic composites, composites of wood fibers and thermoplastic polymers, and wood composites reinforced with cement, fibers, or plastic cladding.

Suitable metallic substrates include, but are not limited to, foils, sheets, or workpieces constructed of cold rolled steel, stainless steel and steel surface-treated with any of zinc metal, zinc compounds and zinc alloys (including electrogalvanized steel, hot-dipped galvanized steel, GALVANNEAL steel, and steel plated with zinc alloy), copper, magnesium, and alloys thereof, aluminum alloys, zinc-aluminum alloys such as GALFAN, GALVALUME, aluminum plated steel and aluminum alloy plated steel substrates may also be used. Steel substrates (such as cold rolled steel or any of the steel substrates listed above) coated with a weldable, zinc-rich or iron phosphide-rich organic coating are also suitable for use in the process of the present invention. Such weldable coating compositions are disclosed in, for example, U.S. Pat. Nos. 4,157,924 and 4,186,036. Cold rolled steel is also suitable when pretreated with, for example, a solution selected from the group consisting of a metal phosphate solution, an aqueous solution containing at least one Group IIIB or IVB metal, an organophosphate solution, an organophosphonate solution, and combinations thereof. Also, suitable metallic substrates include silver, gold, and alloys thereof.

Examples of suitable silicatic substrates are glass, porcelain and ceramics.

Examples of suitable polymeric substrates are polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and natural polymers—such as gelatin.

Examples of suitable textile substrates are fibers, yarns, threads, knits, wovens, nonwovens and garments composed of polyester, modified polyester, polyester blend fabrics, nylon, cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester microfibers and glass fiber fabric.

Examples of suitable leather substrates are grain leather (e.g. nappa from sheep, goat or cow and box-leather from calf or cow), suede leather (e.g. velours from sheep, goat or calf and hunting leather), split velours (e.g. from cow or calf skin), buckskin and nubuk leather; further also woolen skins and furs (e.g. fur-bearing suede leather). The leather may have been tanned by any conventional tanning method, in particular vegetable, mineral, synthetic or combined tanned (e.g. chrome tanned, zirconyl tanned, aluminium tanned or semi-chrome tanned). If desired, the leather may also be re-tanned; for re-tanning there may be used any tanning agent conventionally employed for re-tanning, e.g. mineral, vegetable or synthetic tanning agents, e.g., chromium, zirconyl or aluminium derivatives, quebracho, chestnut or mimosa extracts, aromatic syntans, polyurethanes, (co) polymers of (meth) acrylic acid compounds or melamine, dicyanodiamide and/or urea/formaldehyde resins.

In certain embodiments, the coating compositions of the present invention are suitable for application to "flexible" substrates. As used herein, the term "flexible substrate" refers to a substrate that can undergo mechanical stresses, such as bending or stretching and the like, without significant irreversible change. In certain embodiments, the flexible substrates are compressible substrates. "Compressible substrate" and like terms refer to a substrate capable of undergoing a compressive deformation and returning to substantially the same shape once the compressive deformation has ceased. The term "compressive deformation" and like terms mean a mechanical stress that reduces the volume at least temporarily of a substrate in at least one direction. Examples of flexible substrates includes non-rigid substrates, such as woven and nonwoven fiberglass, woven and nonwoven glass, woven and nonwoven polyester, thermoplastic urethane (TPU), synthetic leather, natural leather, finished natural leather, finished synthetic leather, foam, polymeric bladders filled with air, liquid, and/or plasma, urethane elastomers, synthetic textiles and natural textiles. Examples of suitable compressible substrates include foam substrates, polymeric bladders filled with liquid, polymeric bladders filled with air and/or gas, and/or polymeric bladders filled with plasma. As used herein the term "foam substrate" means a polymeric or natural material that comprises a open cell foam and/or closed cell foam. As used herein, the term "open cell foam" means that the foam comprises a plurality of interconnected air chambers. As used herein, the term "closed cell foam" means that the foam comprises a series of discrete closed pores. Example foam substrates include but are not limited to polystyrene foams, polyvinyl acetate and/or copolymers, polyvinyl chloride and/or copolymers, poly(meth)acrylimide foams, polyvinylchloride foams, polyurethane foams, and polyolefinic foams and polyolefin blends. Polyolefinic foams include but are not limited to polypropylene foams, polyethylene foams and ethylene vinyl acetate ("EVA") foams. EVA foam can include flat sheets or slabs or molded EVA foams, such as shoe midsoles. Different types of EVA foam can have different types of surface porosity. Molded EVA can comprise a dense surface or "skin", whereas flat sheets or slabs can exhibit a porous surface. "Textiles" can include natural and/or synthetic textiles such as fabric, vinyl and urethane coated fabrics, mesh, netting, cord, yarn and the like, and can be comprised, for example, of canvas, cotton, polyester, KELVAR, polymer fibers, polyamides such as nylons and the like, polyesters such as polyethylene terephthalate and polybutylene terephthalate and the like, polyolefins such as polyethylene and polypropylene and the like, rayon, polyvinyl polymers such as polyacrylonitrile and the like, other fiber materials, cellulosics materials and the like.

The coating compositions of the present invention can be applied to such substrates by any of a variety of methods including spraying, brushing, dipping, and roll coating, among other methods. In certain embodiments, however, the coating compositions of the present invention are applied by spraying and, accordingly, such compositions often have a viscosity that is suitable for application by spraying at ambient conditions.

After application of the coating composition of the present invention to the substrate, the composition is allowed to coalesce to form a substantially continuous film on the substrate. Typically, the film thickness will be 0.01 to 20 mils (about 0.25 to 508 microns), such as 0.01 to 5 mils (0.25 to 127 microns), or, in some cases, 0.1 to 2 mils (2.54 to 50.8 microns) in thickness. The coating compositions of the present invention may be colored or clear, and may be used alone or in combination as a primer, basecoat, or topcoat.

Whereas particular embodiments of this invention have been described above for purposes of illustration, it will be evident to those skilled in the art that numerous variations of the details of the present invention may be made without departing from the invention as defined in the appended claims.

Illustrating the invention are the following examples that are not to be considered as limiting the invention to their details. All parts and percentages in the examples, as well as throughout the specification, are by weight unless otherwise indicated.

EXAMPLES

Examples A-C

Preparation of Acrylic Polymers

Acrylic polymers were prepared using the ingredients and amounts (in grams) listed in Table 1. In each case, Charge #1 was added to a 4 necked flask equipped with a motor driven stainless steel stir blade, water-cooled condenser and a heating mantle with a thermometer connected through a temperature feedback control device. The contents of the flask were heated to reflux (120° C.). Addition of Charge #3 was started over 120 minutes. The start of Charge #4 was offset by 5 minutes and added over 120 minutes. The start of Charge #2 was further offset by 5 minutes and added over 90 minutes. Upon completion of the additions, Charges #2, #3 and #4 were rinsed with Charges #5, #6 and #7 respectively. Charge #8 was added over 180 minutes and rinsed with Charge #9. The mixture was held at reflux for and additional hour and further diluted with Charge #10. The resin data is also included in Table 1.

TABLE 1

| Component | Example A | Example B (comparative) | Example C (comparative) |
| --- | --- | --- | --- |
| Charge #1 | | | |
| n-butyl acetate | 152.0 | 152.0 | 152.0 |
| VM&P Naptha | 84.6 | 84.6 | 84.6 |
| Toluene | 33.7 | 33.7 | 33.7 |
| Charge #2 | | | |
| t-butylaminoethyl methacrylate | 3.5 | 3.5 | 3.5 |
| n-butyl acetate | 80.6 | 80.6 | 80,6 |
| Charge #3 | | | |
| Toluene | 22.5 | 22.5 | 22.5 |
| n-butyl acetate | 19.5 | 19.5 | 19.5 |
| t-amyl peroxy-2-ethyl hexanoate | 21.8 | 47.0 | 51.0 |
| Charge #4 | | | |
| Hydroxyethyl acrylate | 100.9 | 100.9 | 100.9 |
| Styrene | 146.2 | 146.2 | 146.2 |
| Butyl methacrylate | 150.0 | 150.0 | 150.0 |
| 2-ethyl hexyl acrylate | 84.3 | 84.3 | 84.3 |
| Methyl methacrylate | 183.1 | 183.1 | 183.1 |
| Methacrylic acid | 3.5 | 3.5 | 3.5 |
| Tertiary dodecana thiol | — | — | 6.7 |
| Charge #5 | | | |
| n-butyl acetate | 5.8 | 5.8 | 5.8 |
| Charge #6 | | | |
| n-butyl acetate | 5.8 | 5.8 | 5.8 |
| Charge #7 | | | |
| n-butyl acetate | 9.8 | 9.8 | 9.8 |
| Charge #8 | | | |
| t-amyl peroxy-2-ethyl hexanoate | 68.8 | 68.8 | 68.8 |
| n-butyl acetate | 5.1 | 5.1 | 5.1 |
| Charge #9 | | | |
| n-butyl acetate | 5.8 | 5.8 | 5.8 |
| Charge #10 | | | |

TABLE 1-continued

| Component | Example A | Example B (comparative) | Example C (comparative) |
| --- | --- | --- | --- |
| n-butyl acetate | 62.5 | 82.0 | 82.0 |
| Analytical Results | | | |
| Tg (° C.—theory) | 26 | 26 | 26 |
| % Solids Weight (measured) | 56.5% | 55.1 | 55.0% |
| OH Value (measured) | 44.4 | 41.5 | 43.0 |
| Acid Value (measured) | 2.1 | 2.1 | 2.2 |
| Weight Average Molecular Weight (measured) | 15,527 | 9,585 | 6,786 |

Examples D-F

Preparation of Pigment Dispersions

Pigment dispersions were prepared using the ingredients and amounts (parts by weight) listed in Table 2. In each case, the resin was used to grind carbon black pigment in n-butyl acetate and Dowanol PMA in a 8 oz. olive jar with one part tint solution to one part 1.2-1.6 mm zircon grinding media. The tint was processed using a Lau disperser to shake the jars and grinding media.

TABLE 2

| Component | Example D | Example E (comparative) | Example F (comparative) |
| --- | --- | --- | --- |
| Example A | 43.36 | — | — |
| Example B | — | 44.54 | — |
| Example C | — | — | 16.73 |
| n-butyl acetate | 9.25 | 8.66 | 3.23 |
| Dowanol PM Acetate | 9.25 | 8.66 | 3.23 |
| Carbon Black Pigment | 6.00 | 6.00 | 2.25 |

Examples G-L

Preparation of Coating Compositions

Coating compositions were prepared using the ingredients and amounts (parts by weight) listed in Table 3. In each case, the components of the A-Pack were mixed together under agitation. After thoroughly mixed, the B-Pack and Reducing Package were added and mixed to the A-Pack to form the coating composition.

TABLE 3

| Component | Ex. G | Ex. H | Ex. I | Ex. J | Ex. K | Ex. L |
| --- | --- | --- | --- | --- | --- | --- |
| A-Pack | | | | | | |
| Dispersion of Example D | 11.17 | 11.70 | — | — | — | — |
| Dispersion of Example E | — | — | 11.17 | 11.70 | — | — |
| Dispersion of Example F | — | — | — | — | 11.16 | 11.66 |
| Resin of Example A | 0.12 | 7.74 | — | — | — | — |
| Resin of Example B | — | — | 0.14 | 7.97 | — | — |
| Resin of Example C | — | — | — | — | 0.13 | 7.96 |
| Acrylic resins[1] | 20.58 | 14.36 | 20.58 | 14.36 | 20.55 | 14.32 |
| n-butyl acetate | 3.51 | 3.68 | 3.51 | 3.68 | 3.51 | 3.67 |
| Dowanol PM acetate | 2.63 | 2.76 | 2.63 | 2.76 | 2.63 | 2.75 |
| BYK 306[2] | 0.09 | 0.09 | 0.09 | 0.09 | 0.09 | 0.09 |
| Afcona 3770[3] | 0.09 | 0.09 | 0.09 | 0.09 | 0.09 | 0.09 |
| Catalyst[4] | 1.22 | 1.27 | 1.22 | 1.27 | 1.21 | 1.27 |
| B-Pack | | | | | | |
| XPH80002[5] | 12.44 | 11.07 | 12.44 | 11.07 | 12.48 | 11.15 |

TABLE 3-continued

| Component | Ex. G | Ex. H | Ex. I | Ex. J | Ex. K | Ex. L |
|---|---|---|---|---|---|---|
| Reducing Package | | | | | | |
| Methyl ethyl ketone | 11.87 | 11.65 | 11.87 | 11.59 | 11.87 | 11.60 |
| t-butyl acetate | 12.61 | 12.37 | 12.61 | 12.31 | 12.61 | 12.32 |
| VM&P Naphtha | 10.99 | 10.78 | 10.99 | 10.73 | 10.99 | 10.73 |
| n-amyl propionate | 12.68 | 12.44 | 12.66 | 12.38 | 12.68 | 12.39 |

[1] Acrylic polyol commercially available from A&P Resin Industrial Co., LTD
[2] Polysiloxane solution from BYK Chemie
[3] Fluorocarbon modified polymer from Afcona Additives
[4] 1% dibutyl tin di-laurate in methyl isobutyl ketone
[5] Isocyanate crosslinker commercially available from PPG Industries, Inc.

Test Substrates

Each of the coating compositions described above was sprayed onto Cycloloy MC8002 PC-ABS using conventional spray technique and baked at 140° F. for 30 minutes. Cured films were tested for gloss, adhesion, and solvent resistance. The results are given in Table 4.

TABLE 4

| Sample | 20° Gloss | Cross-Hatch Adhesion | 50 MEK Double Rubs Rating |
|---|---|---|---|
| Example G | 81 | 5B | 5—Excellent |
| Example H | 89 | 5B | 5—Excellent |
| Example I (comparative) | 92 | 5B | 5—Excellent |
| Example J (comparative) | 84 | 5B | 4—Slight Softening |
| Example K (comparative) | 93 | 5B | 3—Softened |
| Example L (comparative) | 95 | 5B | 1—Softened and Wrinkled |

[1] 20° gloss was measured with a BYK Gardner micro-TRI-gloss instrument.
[2] A multi-blade claw with 1.5 mm spaced teeth (blade and handle/blade holder are available from Paul N. Gardner Company, Inc.) was used to scribe the cured coating. Two sets of scribes were made by scribing the second set on top of and perpendicular to the first set. Detached flakes and ribbons of coating were wiped off the panel and strapping tape (3M #898 available from Minnesota, Mining and Manufacturing Co.) was smoothed firmly over the crosshatch marking. Within 90 seconds of application, the tape was removed in one continuous motion directed toward the tester and as parallel to the panel as possible. The scribed area was inspected and rated for removal of the coating from the substrate according to the following scale: 5B = The edges of the cuts are completely smooth and none of the lattice squares is detached; 4B = Small flakes of coating are detached at intersections. Less than five percent of the area is affected; 3B = Small flakes of the coating are detached along edges and at intersections of cuts. The area affected is five to fifteen percent of the lattice; 2B = The coating has flaked along the edges and on parts of the squares. The area affected is fifteen to thirty-five percent of the lattice; 1B = The coating has flaked along the edges of cuts in large ribbons and whole squares have detached. The area affected is thirty-five to sixty-five percent of the lattice; 0 = Flaking and detachment worse than rating 1 . Over sixty-five percent of the lattice is affected.
[3] Solvent resistance was tested according to ASTM D5402 using methyl ethyl ketone (MEK) double rubs. Results are reported for appearance and mar after 50 double rubs.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

We claim:

1. A pigment dispersion comprising:
(a) a pigment;
(b) an acid functional, hydroxyl functional and secondary amine functional acrylic polymer having a weight average molecular weight of at least 11,000; and
(c) a liquid carrier comprising an organic solvents, wherein the acrylic polymer is a polymerization product of a mixture of monomers comprising:
(i) an alkyl (meth)acrylate having from 3 to 8 carbon atoms in the alkyl group;
(ii) a monomer selected from a styrene, methyl (meth) acrylate, and ethyl (meth)acrylate, or a mixture thereof;
(iii) 0.1 to 5 percent by weight of an ethylenically unsaturated carboxylic acid;
(iv) a hydroxyl-functional ethylenically unsaturated monomer; and
(v) 0.1 to 5 percent by weight of a secondary amine-functional ethylenically unsaturated monomer, wherein the weight percents are based on the total weight of monomers used to make the acrylic polymer.

2. The pigment dispersion of claim 1, wherein the weight ratio of (a) to (b) is at least 0.1:1.

3. The dispersion of claim 1, wherein the weight average molecular weight is 12,000 to 20,000.

4. The dispersion of claim 1, wherein the monomers consist essentially of (i), (ii), (iii), (iv), and (v).

5. The dispersion of claim 4, wherein the monomers consist essentially of:
(i) 1 to 50 percent by weight of an alkyl(meth)acrylate having from 3 to 8 carbon atoms in the alkyl group;
(ii) 10 to 80 percent by weight of a monomer selected from a styrene, methyl(meth)acrylate, and ethyl(meth)acrylate, or a mixture thereof;
(iii) 0.1 to 5 percent by weight of an ethylenically unsaturated carboxylic acid;
(iv) 1 to 50 percent by weight of a hydroxyl-functional ethylenically unsaturated monomer; and
(v) 0.1 to 5 percent by weight of a secondary amine-functional ethylenically unsaturated monomer.

6. The dispersion of claim 1, wherein the monomer (ii) comprises:
(a) 5 to 40 percent by weight of a styrene, and
(b) 5 to 40 percent by weight of methyl(meth)acrylate,
wherein the weight percents are based on the total weight of monomers used to make the acrylic polymer.

7. The dispersion of claim 1, wherein the acrylic polymer is substantially free of any moieties derived from an alkyl methacrylate monomer having greater than 8 carbon atoms in the alkyl chain.

8. A coating composition comprising a film-forming resin and the dispersion of claim 1.

9. The coating composition of claim 8, wherein the composition comprises 1 to 50 percent by weight, based on the total weight of resin solids, of the acid functional, hydroxyl functional and secondary amine functional acrylic polymer.

10. An organic solvent borne pigment dispersion comprising:
(a) a pigment;
(b) an acid functional, hydroxyl functional and secondary amine functional acrylic polymer having a weight average molecular weight of at least 11,000; and
(c) a liquid carrier comprising predominantly an organic solvent,
wherein the hydroxyl functional and secondary amine functional acrylic polymer is substantially free of any moieties derived from an alkyl methacrylate monomer having greater than 8 carbon atoms in the alkyl chain, and
wherein the acrylic polymer is a polymerization product of a mixture of monomers comprising:
(i) an alkyl (meth)acrylate having from 3 to 8 carbon atoms in the alkyl group;
(ii) a monomer selected from a styrene, methyl (meth) acrylate, and ethyl (meth)acrylate, or a mixture thereof;
(iii) 0.1 to 5 percent by weight of an ethylenically unsaturated carboxylic acid:, (iv) a hydroxyl-functional ethylenically unsaturated monomer; and (v) 0.1 to 5 percent by weight of a secondary amine-functional ethylenically unsaturated monomer, wherein the weight percents are based on the total weight of monomers used to make the acrylic polymer.

11. The dispersion of claim 10, wherein the weight average molecular weight is 12,000 to 20,000.

12. The dispersion of claim 10, wherein the monomers consist essentially of (i), (ii), (iii), (iv) and (v).

13. The dispersion of claim 12, wherein the monomers consist essentially of:

(i) 1 to 50 percent by weight of an alkyl(meth)acrylate having from 3 to 8 carbon atoms in the alkyl group;

(ii) 10 to 80 percent by weight of a monomer selected from a styrene, methyl(meth)acrylate, and ethyl(meth)acrylate, or a mixture thereof;

(iii) 0.1 to 5 percent by weight of an ethylenically unsaturated carboxylic acid;

(iv) 1 to 50 percent by weight of a hydroxyl-functional ethylenically unsaturated monomer; and (v) 0.1 to 5 percent by weight of a secondary amine-functional ethylenically unsaturated monomer.

14. A coating composition comprising a film-forming resin and the dispersion of claim 10.

15. The coating composition of claim 14, wherein the composition comprises 1 to 50 percent by weight, based on the total weight of resin solids, of the acid functional, hydroxyl functional and secondary amine functional acrylic polymer.

* * * * *